United States Patent [19]  [11]  3,876,633
Löken  [45]  Apr. 8, 1975

[54] PROCESSES AND INTERMEDIATES FOR 16-SUBSTITUTED CORTICOID SYNTHESIS

[75] Inventor: Bjarte Löken, Mayaguez, P.R.

[73] Assignee: Omni Research Incorporated, San German, P.R.

[22] Filed: Feb. 21, 1973

[21] Appl. No.: 334,358

[52] U.S. Cl. ............... 260/239.55 R; 260/397.45; 260/239.55 D
[51] Int. Cl. .......................................... C07c 173/00
[58] Field of Search ................. 260/239.55, 397.45

[56] References Cited
UNITED STATES PATENTS

| | | | |
|---|---|---|---|
| 3,030,389 | 4/1962 | Julian et al. | 260/397.4 |
| 3,053,865 | 9/1962 | Taub et al. | 260/397.45 |
| 3,072,686 | 1/1963 | Wettstein et al. | 260/397.4 |
| 3,120,517 | 2/1964 | Origoni et al. | 260/239.55 |
| 3,700,660 | 10/1972 | Hempel et al. | 260/239.55 |

Primary Examiner—Elbert L. Roberts
Attorney, Agent, or Firm—Fidelman, Wolffe & Leitner

[57] ABSTRACT

A process for synthesizing 9αfluoro-11β hydroxy steroids such as dexamethasone, betamethasone, triamcinolone, and many derivatives thereof from the hecogenin derived 3β-acetoxy-5-α-pregna-9(11),16-diene-20-one by selective hypobromous acid addition in aqueous acetone followed by ring closure to produce 9β, 11β-epoxy- 16 steroids. Then reactions known to the art within a context of other steroids reactants may be employed to convert the 9β, 11β-epoxy-oxide Δ 16 steroid into triamcinolone acetoride. For the syntheses of dexamethasone and betamethasone, the subsequent reaction sequence includes a Grignard addition reaction of 9β, 11β-epoxy steroids with copper complexed methyl magnesium bromide or iodide in tetrahydrofuran to introduce selectively the 16 methyl group into such steroids.

The products of selective bromohydrin formation and ring closure, namely 3β hydroxy and acetoxy 9β, 11β-epoxy-5αpregna-16-ene-20-one are novel compounds, as are many of the other intermediates produced during the reaction sequences described.

24 Claims, No Drawings

PROCESSES AND INTERMEDIATES FOR 16-SUBSTITUTED CORTICOID SYNTHESIS

This invention relates to steroids: more particularly to novel intermediates and methods for the preparation of dexamethasone (which is $11\beta$, $17\alpha$, 21-trihydroxy-$9\alpha$-fluoro-$16\alpha$methyl-1,4-pregadiene-3,20-dione) and other useful corticoids, characterized by the $9\alpha$-fluoro-$11\beta$-hydroxyl moiety. The starting material is $3\beta$-lower acyloxy-$5\alpha$-pregna-9(11),16-dien20-one, readily available from hecogenin according to well described methods. (Ref: R. K. Callow and V. H. T. James: J. Chem. Soc. 4739 (1956); R. Hirschmann and Coworkers. J. Am. Chem. Soc. 75, 3252, (1953); C. Djerassi and Coworkers, J. Org. Chem. 16, 1278 (1951). Preferred is the 3-$\beta$-acetoxy compound, and for exemplary purposes, the invention will be described in terms of this preferred starting material.

The previous workers in the art have synthesized corticoids via an intermediate containing either a keto oxygen or a $\beta$-oriented hydroxyl group attached at C–11. Their end product was cortisone or hydrocortisone, and later prednisone and prednisolone. The 11-keto or 11-hydroxylated intermediates were available by microbiological methods from substrates prepared from diosgenin. The most popular way of preparing the even more potent corticoids with topical anti-inflammatory activity characterized by the $9\alpha$-fluoro-$11\beta$-hydroxy moiety was the introduction of the 9,(11)-double bond via elimination of $11\beta$ or $\alpha$ hydroxyl, preparation of the $9\beta,11\beta$-epoxide by hypobromous acid addition and base treatment, followed by HF opening of the epoxide to the desired 9,11-fluoro hydrin. Various authors advocating hecogenin as source material also contemplate a starting material with a 11-hydroxyl or 11-keto, which later in the synthesis is eliminated to form the 9(11) double bond necessary for the $9\alpha$-fluoro introduction via the $9\beta, 11\beta$-epoxide Such detour in the synthesis of the more potent corticoids resulted in loss in overall yield, because no method was known which selectively permitted reactions elsewhere in the steroid molecule, without coreaction at the 9(11)-double bond. For example, epoxidizing the 17(20) double bond of a 20-enolacetate selectively with a peracid could not be accomplished without coepoxidizing the 9(11)-double bond, giving the useless $9\alpha11\alpha$configuration, or conversely, reacting at the 9(11) double bond, without causing adverse reaction at the 16-double bond-20-ketone moiety.

It has now been found that the $3\beta$-acetoxy- $5\alpha$-pregna 9(11), 16-dien-20-one can selectively form the bromohydrin by addition of hypobromous acid exclusively to the 9(11) double bond. The $\Delta$ 16-20-ketone moiety is left intact. There is no allyllic bromination, there is no addition of bromine (Br.) to double bond systems resulting in vic.-dibromides either at 9,11 or 16,17. This is surprising as the aqueous acetone reaction milieu is known (B. Loken et al. J. Am. Ch. Soc. 78, 1738 (1956) to promote the addition of the hypobromous acid-generated in situ to the 16-double bond of a 20-ketone. However, this undesired side reaction is very slow. By maintaining low reaction temperatures and preventing a high concentration of hypobromous acid by slow addition of reagent (NBA or dibromantine, the side reaction was kept down to an undetectable level within the period required for completing the addition to the 9(11) double bond (1½ – 2½ hours).

In the prior art, instances are known where the 9(11) double bond is reacted selectively with hypobromous acid. Thus J. Fried et al. (J. Am. Chem. Soc. 75, 2273 (1953); 76, 1455, (1954), describe preferential addition at the 9(11) double bond of a $\Delta^{1,4}$-dien-3-one, and leaving the 4 double bond of a $\Delta^4$-3-ketone intact. Their solvent system, aqueous dioxane, was tried for reacting the 9(11) double bond of a $\Delta^{9(11),16}$diene-20-ketone. A complex mixture of reactants resulted at low temperatures with peroxide free dioxane.

For promoting the desired reaction, hypobromous acid is generated in situ by addition of the appropriate N-bromoamide which as a primary product forms hypobromous acid $OH^-Br^+$. The bromonium ion is highly unstable and will react at a certain rate with water and ionic species to form $Br_2 \rightarrow 2Br\cdot$. To obtain a selective performance with minimum of side reactions, the $Br^+$ needs to add fast so as to be removed before reacting further to form $Br\cdot$, the concentration of which must be kept down to the lowest possible level to avoid side reactions. It has been found that aqueous acetone is a unique solvent system in that it apparently serves as a scavenger for any $Br\cdot$ formed. The scavanging effect is indicated organoleptically during workup of the reaction by the presence of bromo acetone - a strong lachrymator - a compound which only can be formed via attack on acetone by $Br\cdot$. Any undesired addition to the 16 double bond, thus destroying the $\Delta^{16}$-20-ketone chromophore can be determined by ultraviolet measurement. The above is offered as explanation for why it is possible to obtain such a clean selective addition to the 9(11) double bond.

The resulting bromohydrin is a very unstable compound, but nonetheless it can be isolated in pure form and recrystallized. It may be used crude for the next step, which is closing the epoxide transaxially, retaining the $\beta$-spatial configuration of the oxygen constituent to obtain the $9\beta$, $11\beta$-oriented oxirane, i.e. $3\beta$-acetoxy-$9\beta$, $11\beta$-epoxy-$5\alpha$-pregn-16-ene-20-one. This reaction is usually achieved with a base, either sodium or potassium acetate in acetone or methanol, or by the use of an organic base. It has been found that the bromohydrin is very unstable and suffers decomposition during isolation. If base treated while in the acetone/water suspension from its formation reaction, a considerable gain in yield and more favorable handling characteristics are engendered. Such base system may be created by adding a strong aqueous sodium hydroxide solution in excess of the perchloric acid and other base consuming functional groups present. By manipulating the temperature, the $9\beta,11\beta$-epoxide may be obtained either as the 3-acetate or as the 3-hydroxyl derivative.

For the reactions involved, it is essential that the solvent system is such that no other nucleophile other than $OH^-$ is formed. Acetone is ideal in that respect and so is butane. Methanol and any other primary alcohol are objectionable because of formation of the $^-OR$ (R = alkyl) anion, which would add to the 16-position to form a $16\beta$-alcoxyl, thus saturating the double bond which is undesired. Such nucleophilic attack on $\Delta^{16}$-20-ketones is well known in the literature, and termed as a Michaeltype addition. The acetate group at C-3 is hydrolyzed when the temperature is high and retained when the alkali exposure is effected at room temperature. Agitation is essential when practicing this procedure since the reaction mixture consists of two layers.

Thus, to recapitulate, the process of the present invention involves bromination of 3β-lower-acyloxy-5αpregna-9(11), 16-dien-20-one is suspension in aqueous acetone or in aqueous butanone, desirably in the absence of light, the hypobromous acid addition is effected at temperatures below about 15°C., preferably 0°–5°C. with a controlled slow addition of the hypobromous acid generating reagent, which reagent may for example, be dibromantin, N-bromoacetamide or N-bromo succinimide. The perchloric acid reagent is introduced into the solvent system before addition of the brominating reagent. The resulting steroid, e.g. 11β-hydroxy-3β-acetoxy 9α-bromo-5α-pregn-16-ene20-one, may be recovered as a product for further conversion. In a preferred mode of the invention, the crude product is converted directly, through reaction with alkali, preferably aqueous NaOH or KOH to the corresponding 9β,11βepoxide. By reacting at elevated temperatures, the 3-lower acylate is simultaneously converted to the 3-hydroxyl steroid. The resulting 3β-hydroxy or lower acyloxy-9β, 11β-epoxy-5α-pregn-16-ene-20-one may be recovered readily and converted as hereinafter described. The 3β-hydroxy compound may be converted to any of the 3β-lower acyl corresponding compounds by reaction with the appropriate acyl chloride. The 3β-hydroxy and 3β-acetoxy compounds are, however, preferred products of this invention. The following formula sequence A illustrates the above described conversion (I, II and III) as well as the selective treatment of the 20-keto-16-ene moiety (III to VIII).

roid molecule. The present process contemplates employing cuprous chloride complexed methylmagnesium bromide or iodide in tetrahydrofuran for this purpose. The bromide is preferred by far.

Marker (J. Am. Chem. Soc. 64, 1280 (1942)) demonstrated the 1,4-addition of methylmagnesium iodide to a $\Delta^{16}$-20-ketone, leading into the introduction of a 16α-methyl substituent. Since then Marker's conditions were improved upon. Wettstein and Heusler (Helv. Chim. Acta. 35, 284 (1952)) employed the methylmagnesium iodide reagent for introducing the 16α-methyl group into such derivatives obtained from hecogenin as 3β-acetoxy-5αpregn-16-ene-11,20-dione and 3β11α-diacetoxy-5α-pregn-16ene-20-dione, but so far as is known, the methylmagnesium iodide has not been employed for introduction of the 16α-methyl group in the presence of a 9β, 11β-epoxide. It has now been discovered that the methylmagnesium iodide is inert towards undesired attack on the 9β, 11β-oxirane ring. It has now been found that the methylmagnesium bromide is a much superior and convenient reagent for effecting the 1,4-addition to the $\Delta^{16}$-20-one moiety, for the following reasons:

1. methylmagnesium bromide forms a clear solution in tetrahydrofuran, whereas methylmagnesium iodide does not,
2. the complexing by cuprous chloride addition is done much more uniformly when the alkylmagnesium halide is in solution,
3. much less CuCl is used, namely only about 10% of that used by Wettstein and Heusler,

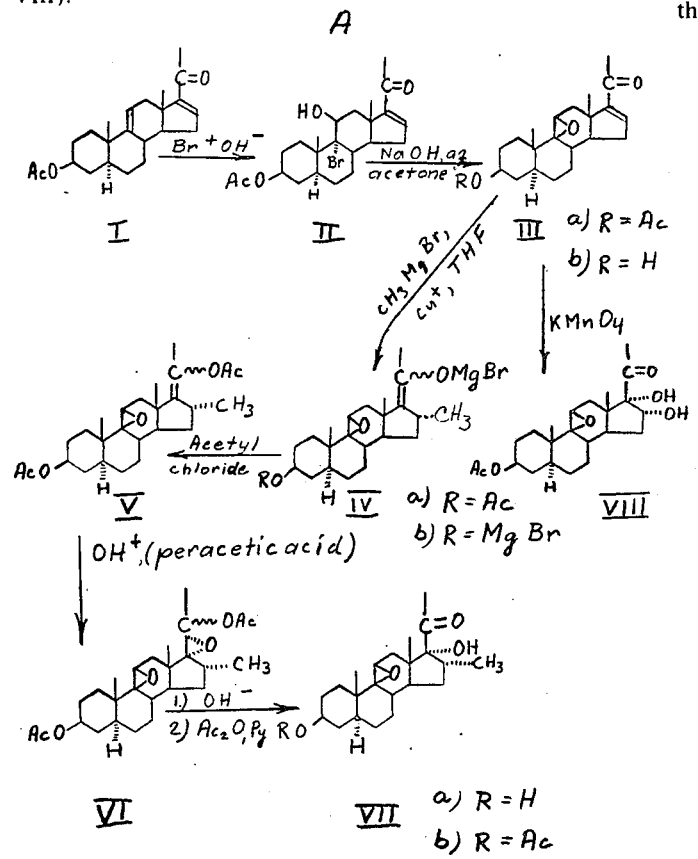

A further aspect of this invention, one particularly important to the synthesis of dexamethasone and betamethasone, is employment of a Grignard additional reaction to add the 16-methyl group to the ste- 4. reaction reproducibility - because of uniform complexing - is improved,
5. methylmagnesium bromide 2M solution in tetrahydrofuran can be obtained as a commercial reagent.

In the case of using methylmagnesium iodide as described by Wettstein and Heusler, heat evolves upon addition of tetrahydrofuran to the reagent prepared in ether. Such heat formation is liberation of the heat energy of crystallization because methylmagnesium iodide is difficult to solubilize in tetrahydrofuran, whereas methylmagnesium bromide is very soluble. The properties referred to above are based upon thermodynamic facts and cannot be changed. Complexing the suspended methylmagnesium iodide reagent by addition of CuCl (also a solid) with very limited solubility in tetrahydrofuran, never leads to the uniform complexing essential for selective 1,4-addition of the reagent. In any event, with the $9\beta$, $11\beta$-epoxy starting material at hand, the reagent based upon methylmagnesium bromide has been found superior, 6. an additional advantage with methylmagnesium bromide reagent over methylmagensium iodide is that the Grignard product, the magnesium enol salt (IV) is in solution. This is an advantage for the next step, the acetylation with acetyl chloride, where the acid chloride is added directly to the reaction mixture and the reaction is very fast (about 10 minutes to form the enol acetate in the case of acetyl chloride).

In practicing the Grignard reaction it is possible to reverse the addition without any additional precautions. Conventional or reversed addition did not make any noticable difference in the overall result.

The immediate product of the Grignard reaction has the structure (IV) characteristic of a 20-enol magnesium salt of the bivalent magnesium cation $(Mg^{++})_2$, the anions being $Br^-$ and the enolate anion with the negative charge on the oxygen atom ($R = C\text{-}O^-$). Such salts are reactive. Stork et al (U.S. Pat. No. 3,080,393, Mar. 5, 1963) have described how these enol salts can be oxidized to structures containing the $17\alpha$-hydroxy-20-ketone moiety - either directly with air oxidation or via transfer to the lithium enol salt followed by air oxidation. The yields, however, are not sufficient to be economically feasible. Instead, it has been found much better to react 20-magnesium enol salt (IV) in situ - in a clear solution - by adding acetyl chloride. This converts the enol salt to the enol acetate - actually the C-20 cis and trans epimers are obtained as a mixture, both of which can be directly converted to the 20-keto-17-hydroxy derivative (VII) by oxidation with peracetic acid followed by alkaline hydrolysis.

The method of the present invention is superior to that of Heusler et al (Helv. XLII, 2043 1959)). In practicing the Grignard reaction to introduce the $16\alpha$-methyl group and to form the enol salt IV, note has been made of the advantages of using methylmagnesium bromide instead of the iodide. In addition, the reaction with acetyl chloride to obtain the enol acetate V is very fast (10 min) and goes to completion as a result of the mangesium enol salt being in solution, thus creating a one-phase reaction milieu. The reaction can be followed by thin layer chromatography (TLC), which evidences formation of the C-20 cis and trans epimeric acetates. TLC also shows that any of the C-3 acetate hydrolyzed by the Grignard reaction is reintroduced by interchange with the resulting BrMg-O-R group at that position. Heusler et al isolated their intermediate enol acetate prior to the peracid oxidation. Such practice is considered exceedingly wasteful. With the improved conditions during the Grignard (no attach at the $9\beta$, $11\beta$-epoxide at all) and the acetylation (the thin layer control detected the presence of only two entities, namely both the C-20 cis and trans epimers of the enol acetates), it has been found that the reaction mixture of V needs no purification. The THF solution need only be taken down to dryness under reduced pressure in a water bath, the residue taken up in dichloromethane, the inorganics (Mg salts) washed out with water, and then buffered commercial peracetic acid added directly to the dichloromethane solution. The peracetic acid may be added directly to the reaction solution of V, and compound VI obtained in the same yield. For safety reasons, it is not good practice to combine an ether solvent (tetrahydrofuran) with a peracid. However, actual isolation of the intermediate enol acetate (V) would be troublesome as such epimeric mixtures do not crystallize readily.

For the peracid step to obtain VI, also a C-20 epimeric mixture, it has been found that many other peracids performed well including perbenzoic, permaleic, monoperphthalic, methachloroperbenzoic, etc. However, the two epimeric enol acetates reacted at different rates with different peracids, which can be demonstrated by TLC. One peracid, the metachloroperbenzoic acid, reacted fast with the less hindered enol acetate and not at all with the most hindered. Peracetic acid which is preferred was unique in reacting to completion with both epimers, although at different rates.

It may be noted that for the acetylation of the enol salt, one can if desired use acetic anhydride instead of the acetyl chloride. Many other acyl acid chlorides or anhydrides may be used such as propionic, butyric-valeric, cyclopentylpropionic.

It is also noted that the small amounts of cuprous salt added for complexing do not make impossible the direct epoxidation of the Grignard reaction product after acetylation. The ether solvent tetrahydrofuran must be distilled first off for reasons of safety.

The anhydrous magnesium salts present orginating from the Grignard reaction - did not interfere with the peracetic acid epoxidation but rather promoted the reaction by forming hydrates with the water and possibly the acetic acid in the commercial peracetic acid, thus preventing an aqueous phase from forming in the chloroform or dichloromethane solvent system used for the epoxidation. All the peracid will be in the non-aqueous phase. The foregoing is an explanation of why the epoxidation progressed without the hydroxylation side reaction when buffered peracetic acid was added directly to the reaction misture from the previous step.

The alkaline hydrolysis of the bis epoxide VI to the $16\alpha$-methyl-$17\alpha$-hydroxy-20-ketone VII is best carried out in aqueous methanol with potassium or sodium carbonate as the base but the alkali metal hydroxide is also good. The reaction is surprisingly sluggish and takes a long time to complete. Considerable steric hindrance about one of the C-20 acetate epimers may exist.

The product III of the selective hypobromous acid addition followed by base treatment is an excellent source of the vic. $16\alpha$, $17\alpha$diol (VIII). It is formed in good yield from III by a simple oxidation with potassium permanganate.

The novel products II-VII of this invention are very useful compounds for they can be converted to dexamethasone by applying such reactions and pathways as are shown in the following formula sequence.

*B*

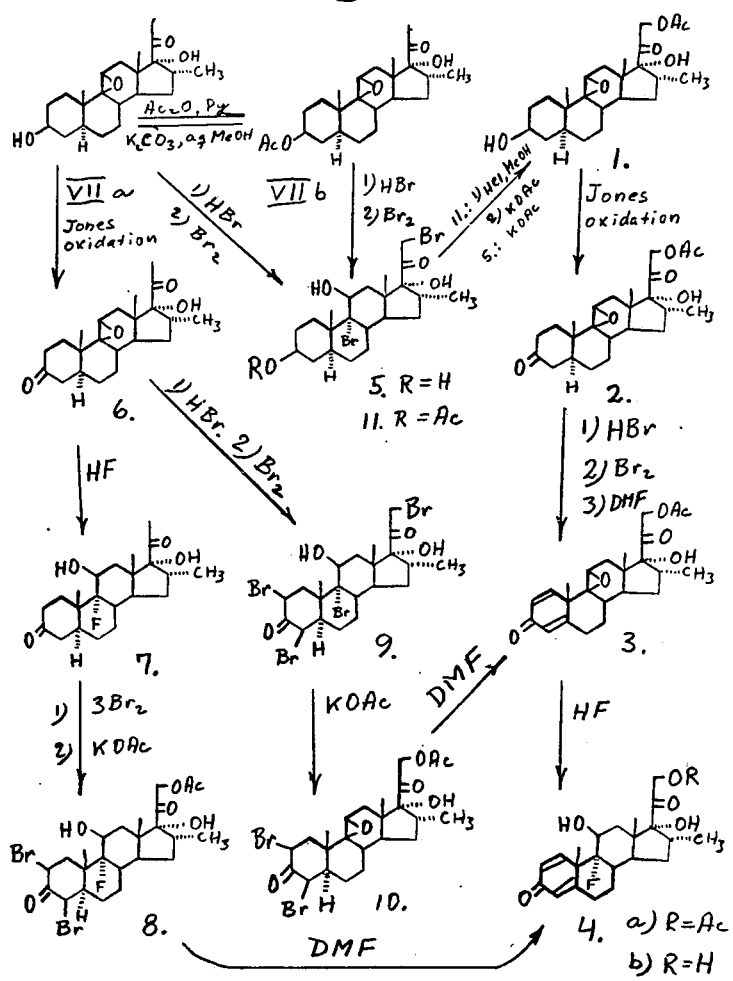

The compound VIII (16α, 17α-dihydroxy-3β-acetoxy9β,11β-epoxy-5α-pregn-an-20-one) can be treated in a pathway analogous to the sequence B for introduction of the 21-acetate function and the 3-keto-1,4-dienoic moiety in ring A to give the compound: 16α, 17α-dihydroxy-21-acetoxy-9β, 11β-epoxy pregna-1.4-diene-3,20-dione which is convertible to triamcinolone and trimacinolone acetonide according to the procedure of S. Bernstein et al (J. Am. Chem. Soc. 81, 1689 (1959)).

The formula sequence B illustrates the transformations from 17α-hydroxy-3β-acetoxy-9β,11β-epoxy-16α-methyl-5α-pregnan-20-one (VIIb) to dexamethasone acetate [B, 4(a)] by bromination of the 3-acetate to give 11β, 17α-dihydroxy-3β-acetoxy-9β, 21-dibromo-16α-methyl-5α-pregnan-20-one (11) which is interchanged with methanolic HCl to give 3-β, 11β, 17α-trihydroxy-9β,-21-dibromo-16αmethyl-5α-pregnane-20-one in which the 21-bromo group can be replaced by acetoxy and the 9,11-beta epoxide reclosed at the same time by the use of potassium acetate to give 3β, 17α-dihydroxy-16α-methyl-21-acetoxy-9β, 11β-epoxy-5α-pregnan-20-one (1). The latter compound may be oxidized to the 3-keto derivative (2 ). The keto derivative may be 2,4-dibrominated with HBr and bromine and then bis-dehydrobrominated, in the process of which the 9,11 bromohydrin is formed and the 9,11 epoxide reclosed to give 17α-hydroxy-21-acetoxy-9β, 11β-epoxy-16α-methylpregna-1,4-diene-3,20-dione (3). Reaction of 3. with HF gives dexamethasone 21-acetate (4a).). Alternatively the compound VII above, 3β, 17α-dihydroxy, 9β, 11β-epoxy-16α-methyl-5α-pregnan-20-one, may be oxidized with chromic oxide with sulfuric acid to give 17α-hydroxy-9β, 11β-epoxy-16α-methyl-5α-pregnane-3,20-dione (6.). The latter may be tetrabrominated with bromine and HBr to give 2,4,9,21-tetrabromo-11β, 17α-dihydroxy-16α-methyl-5α-pregnan-3,20-dione (9.), which can be converted by potassium acetate to 17α-hydroxy-21-acetoxy-9β, 11β-epoxy-2,4-dibromo-16α-methyl-5α-pregnane-3,20-dione (10.), which in turn can be dehydrohalogenated to the known intermediate 3., convertible with HF to dexamethasone acetate.

The compound 6. (17α-hydroxy-9β, 11β-epoxy -16-α-methyl-5α-pregnane-3,20-dione) may be in an alternative procedure directly treated with HF for introduction of the 9,11-fluorohydrin moiety to give 7. This compound is reacted with three mole ratios of bromine to give the 2,4,21-tribromide. This intermediate is reacted with potassium acetate in acetone which will introduce the 21-acetate group by acetolysis ("acetoxylation"), whereas the 9,11 fluorohydrin moiety is left unchanged. The homologous bromohydrin is known to be close to the 9β, 11β-epoxide in agreement with out experience while working on the other pathways illustrated in formula sequence B.

There is another pathway which can use the very insoluble diol VIIa as it comes out of the reaction mixture from the aqueous methanolic hydrolysis. There is no need to prepare the 3-monoacetate VIIb. The diol VIIa is brought into solution as it reacts with hydrogen bromide in acetic acid, and then added one mole ratio of bromine before the bromohydrin is permitted to crystallize out. Potassium acetate treatment sufficiently forms 1. (which is $3\beta$, $17\alpha$-dihydroxy-$21$-acetoxy-$9\beta$, $11\beta$-epoxy-$16\alpha$-methyl-$5\alpha$-pregnan-$20$-one).

Betamethasone acetate may readily be prepared using procedures used in part in the dexamethasone and triamcinolone syntheses. Thus, as shown in formula sequence C, compound IIIa described may be oxidized with alkaline hydrogen peroxide as described in another series by Julian et al, J. Am. Chem. Soc. 72, 5145 (1954), to give $3\beta$-acetoxy-$9\beta$, $11\beta$:$16\alpha$,$17\alpha$-bisepoxy$5\alpha$-pregnan-$20$-one (12.). The latter compound is converted to the 20,20-ethylene dioxy derivative (13.) with ethylene glycol and p-toluene sulfonic acid as described by Julian et al, J. Am. Chem. Soc. 77, 4601 (1955). The 20,20-ethylenedioxy derivative is then reacted with methyl magnesium bromide to give the key intermediate, $3\beta$, $17\alpha$-dihydroxy-$9\beta$, $11\beta$-epoxy-$16\beta$-methyl-$5\alpha$-pregnan-$20$-one (14.), which can be converted to the 3-keto analog (15.) by hydrolysis and Jones oxidation, and then to betamethasone acetate 17. by methods analogous to those already described here for dexamethasone and triamcinolone.

water containing therein 6 g sodium acetate (buffer) and 4 g potassium metabisulfite. The completeness of the reduction was checked with potassium idodide-starch impregnated paper. The 40 ml added represented a little excess.

At this point, the reaction product II ($11\beta$-hydroxy$3\beta$-acetoxy-$9\alpha$-bromo-$5\alpha$-pregn-$16$-en-$20$-one) was present as a crystalline slurry. To this slurry was added 40 ml of 10 N aqueous sodium hydroxide solution and the mixture maintained at 30° for one hour. The purple colored suspension was neutralized by addition of 18 ml 12.5N HCl in 160 ml water.

After neutralization, the color was pale yellow. 40 ml additional water was added and the mixture was cooled to about 10°, filtered and the crystals washed with 100 ml water - acetone 1:1. The slightly tan crystals were washed with water in abundance, collected and dried. The crude IIIa ($3\beta$-acetoxy-$9\beta$, $11\beta$-epoxy$5\alpha$-pregn-$16$-en-$20$-one) obtained corresponded to a weight yield of 80 percent (22.5 g). Mp. 185°–187°; $[\alpha]_{D'} = +73°$ (Chlf.) Two recrystallizations from ethyl acetate provided the analytical sample: M.P. 202°–203°, I.R. spectrum: $\lambda$ max at: 5.8; 6.0, 6.25; 8.0; 9.4; 9.6; 11.0$\mu$.

U.V. spectrum:$\lambda_{max}$: $237m\mu$ ($\epsilon = 10416$ in methanol)

C

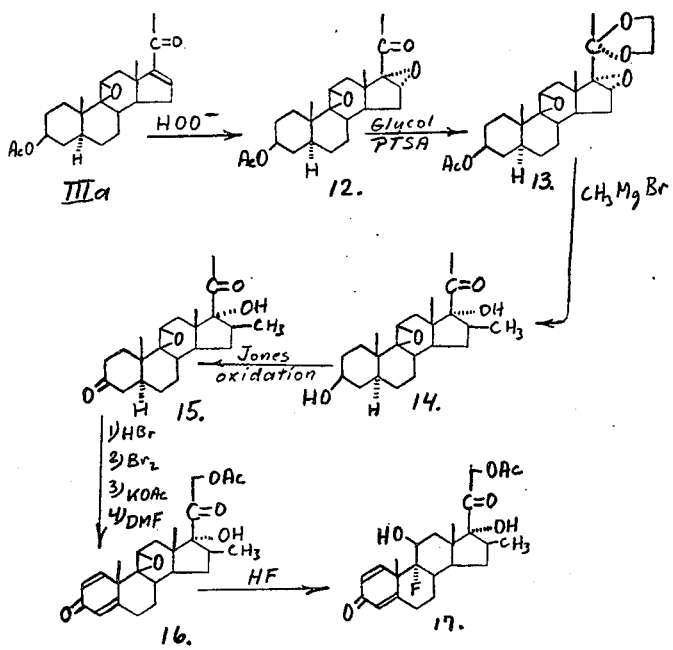

EXAMPLE 1:

To a slurry of I ($3\beta$-acetoxy-$5\alpha$-pregna-$9(11)$, 16-dien-$20$-one), 28 g in 280 ml of acetone was added a solution of 2.4 ml perchloric acid (70 percent) in 40 ml of water and the temperature was adjusted to 0°–5° by ice-water cooling. The flask was covered with dark cloth in order to exclude the light; and dibromantin (e.g. 1,3-dibromo-5,5-dimethylhydantoin) added in small portions while stirring and the addition distributed evenly over a period of one hour. During this period, a total of 18 g dibromantin was added with stirring and strict maintenance of the temperature at 0°–5°. After completion of the addition, the mixture was kept agitated in the dark for another hour at the same temperature. At this time, the reaction was stopped by reducing the excess hypobromous acid with 440 ml of Anal. Calcd. for $C_{23}H_{32}O_4$: C, 74.16; H, 8.66
Found: C, 73.95; H, 8.75

EXAMPLE 2:

28 g of I ($3\beta$-acetoxy-$5\alpha$-pregna-$9(11)$, 16-dien-$20$-one) was treated exactly as described in Example 1 but the temperature was kept at 15°C. during the addition of dibromantin, which was completed within one-half hour and was allowed to reach 25° one-half hour after completing the addition. Quenching with the aqueous solution of sodium acetate/bisulfite as described in Example 1 leads to a crystalline slurry of the bromohydrin II ($11\beta$-hydroxy-$3\beta$-acetoxy-$9\alpha$-bromo - $5\alpha$-pregn-$16$-en-$20$-one). Addition of 200 ml of water slowly and under cooling completely precipitated the bromohydrin. The mixture was filtered, washed on the filter with acetone-water 1:1, then with water. The material was collected, dried in a vacuum dessicator overnight at 30° in the dark. 26 parts of crude bromohydrin II was obtained in this manner. Recrystallization by dissolving in dichloromethane and codistilling with ethyl acetate under reduced pressure in a water bath of 30°, gave the purified sample; m.p. 117°d when heated all the way, and 124°–129°d when capillary was inserted at 115° and heated at a rate of 6° per minute.

EXAMPLE 3:

10 g of the recrystallized bromohydrin II was refluxed for 20 hours with 15 g of potassium acetate in 300 ml of acetone. Addition of 300 ml of water and cooling gave a crystalline precipitate which was filtered and washed on the filter with acetone/water (1:1), water, collected and dried. There was obtained 6.8g of product which by TLC showed one more and one less polar impurity and melted at 181°. One recrystallization from ethyl acetate gave a purified product: m.p. 186°–187°, which was identical with the 9$\beta$, 11$\beta$-epoxy-3-acetate IIIa described in Example 1 (by mix melting point and I.R. comparison).

EXAMPLE 4:

7 parts of II (11$\beta$-hydroxy-3$\beta$-acetoxy-9$\alpha$-bromo-5$\alpha$-pregn-16-en-20-one) was slurried in 70 ml of acetone and 20 ml of water, heated to reflux and to this mixture there was added during 2–5 minutes, 10 ml of an aqeuous 10N solution of sodium hydroxide. The mixture was kept agitated under reflux for 1½ hour, cooled, neutralized by addition of about 7 ml of HCl conc. in 40 ml of water. A crystalline slurry was obtained which was left standing in the refrigerator overnight. The crystals were filtereed, washed on the filter with a little acetone/water (1:1), and with much water to remove the salts. The material was collected, dried. 4.4 g of crystalline material was obtained. Recrystallization from ethyl acetate gave the purified sample m.p. 170°–171°C.

The infrared spectrum agreed with the product being IIIb (3$\beta$-hydroxy-9$\beta$, 11$\beta$-epoxy-5$\alpha$-pregn-16-en-20-one).

EXMAPLE 5:

28 g of I (3$\beta$-acetoxy-5$\alpha$-pregna-9(11),16-dien-20-one) was treated exactly as described in Example I until the bromohydrin product II (11$\beta$-hydroxy-3$\beta$-acetoxy-9$\alpha$-bromo-5$\alpha$-pregn-16-en-20-one) had separated as a crystalline slurry. To this slurry was added 40 ml of 10N aqueous sodium hydroxide solution, but now the mixture was stirred under reflux for 105 minutes. Cooling, neutralization as before (about 18 ml 12.5N HCl in 160 ml water) and addition of 80 ml water resulted in a crystalline suspension from which IIIb (3$\beta$-hydroxy-9$\beta$, 11$\beta$-epoxy-5$\alpha$-pregn-16-en-20-one) could be isolated by filtration and those washings outlined in Example 1. 18.5 g of IIIb obtained m.p. 169°–170°, I.R. spectrum: $\lambda_{max}$ at: 2.85; 6.0; 6.28; 7.3; 8.2; 9.4; 9.65$\mu$.

U.V. spectrum $\lambda_{max}$, 236$m\mu$ ($\epsilon$ = 10050 in methanol).

EXAMPLE 6:

To 120 ml 2N(0.24 Mole) commercial methylmagnesium bromide in tetrahydrofuran/benzene-kept agitated in an inert atmosphere (argon or nitrogen) - was added 100 mg finely powdered cuprous chloride. This addition was done at room temperature; immediately thereafter the mixture was cooled to 5°C. as fast as possible (4–5min.) A solution of 30g of IIIa (3$\beta$-acetoxy9$\beta$,11$\beta$-epoxy-5$\alpha$-pregn-16-en-20-one, 0.08 Mole) in 180 ml dry tetrahydrofuran was added as fast as possible, the addition being governed by the temperature not being allowed to go above 20°. The reaction was essentially complete 5 minutes after the addition. The immediate product of the Grignard reaction was the magnesium salt IV in solution. Quenching the reaction by addition of a saturated solution of ammonium chloride in water lead to the formation of the 20 ketone 18. a)b) (a mixture rich in the 3$\beta$-hydroxy derivative when methylmagnesium bromide is used for reagent, rich in the 3-acetate if the Grignard reagent is methyl magnesium iodide). Decanting through a filter after the quenching and concentrating the organic extract to dryness lead to a residue. Half of this residue was acetylated by refluxing for one-half hour with 14 g. acetic anhydride and 15g pyridine. Cautious water addition gave crystalline 18.a) (3$\beta$-acetoxy-9$\beta$, 11$\beta$-epoxy-16$\alpha$-methyl-5$\alpha$pregnan-20-one).

The other half was refluxed for one hour with 7g potassium carbonate in 140 ml methanol and 40 ml water. Cooling caused 18.b) (3$\beta$-hydroxy-9$\beta$,11$\beta$-epoxy-16$\alpha$-methyl-5$\alpha$-pregnan-20-one) to crystallize directly from the reaction mixture.

Quenching of the Grignard product with saturated ammonium chloride as described (leading to the isolation of compounds IVa, IVb) is also very useful for checking the completeness of the Grignard reaction. Quenching can be carried out in a culture tube containing the ammonium chloride solution, to which a small sample drawn from the reaction mixture is added, shaken quickly and the upper layer can be spotted directly on a thin layer chromatographic plate with U.V. indicator. The reaction is complete when no more starting material is detected by absorption of the U.V. light at its TLC spot.

Half of the quenched material representing the reacetylated 18a) (3$\beta$-acetoxy-9$\beta$, 11$\beta$-epoxy-16$\alpha$-methyl-5$\alpha$-pregnan-20-one) about 12 g - was dissolved in 100 ml dry t-butanol and added to a solution of potassium t-butoxide prepared from 8g of potassium in 210 ml t-butanol. This mixture was shaken in an oxygen atmosphere for half an hour, by which time about 1 mole ratio of oxygen had been absorbed. Neutralization with aqueous acetic acid, evaporation of the butanol under reduced pressure and cooling produced a slurry of the intermediate 17-hydroperoxy derivative, which was filtered off, dissolved in 600 ml acetic acid and stirred at room temperature with 30 g zinc dust for a period of 5 hours. The zinc was filtered off, and the filtrate concentrated under reduced pressure to a small volume. The product was extracted with dichloromethane, and the residual acetic acid removed with two aqueous washings and the dichloro-methane solvent was removed by evaporation. Distillation with a little methanol removed the residual dichloro-methane and there was obtained a crystalline slurry. The crystals were filtered, washed on the filter with a little methanol, collected and dried. 6.5 g was obtained, m.p. 165°–168°. The infrared spectrum was identical with that of VIIb (17$\alpha$-hydroxy-3$\beta$-acetoxy-9$\beta$, 11$\beta$-epoxy-16$\alpha$-methyl-5$\alpha$-pregnan-20-one), see Example 12. There was no depression in the melting point when determined in admixture with VIIb prepared as in Example 12.

The other half of the quenched material representing the resaponified 18b (3β-hydroxy-9β, 11β-epoxy-16α-methyl-5α-pregnan-20-one) was treated exactly as 18a) above, with the exception that ethyl acetate was used in the final crystallization instead of methanol. 7.5 g of the highly insoluble VIIa (3β,17α-dihydroxy-9β, 11β-epoxy-16α-methyl-5α-pregnan-20-one) was obtained. M.P. 255°–260°. Mix melting point and infrared comparison supported the identity with compound VIIa as isolated in Example II. (Formula set D illustrates the conversions of Example 6.

chloroform which was distilled off to remove the last traces of tetrahydrofuran. The oily syrup was taken up in chloroform (about 900ml) and transferred to a 4l separatory funnel, charged with ice and water and 50 ml acetic acid to about 2l. The anhydrous magnesium salts present in the chloroform combine with water to form hydrates evolving heat. The separatory funnel was moved gently until the ice had melted. It was then shaken energetically and allowed to stratify. The lower layer was separated and the remaining aqueous phase re-extracted with two tailers of chloroform (100ml

D

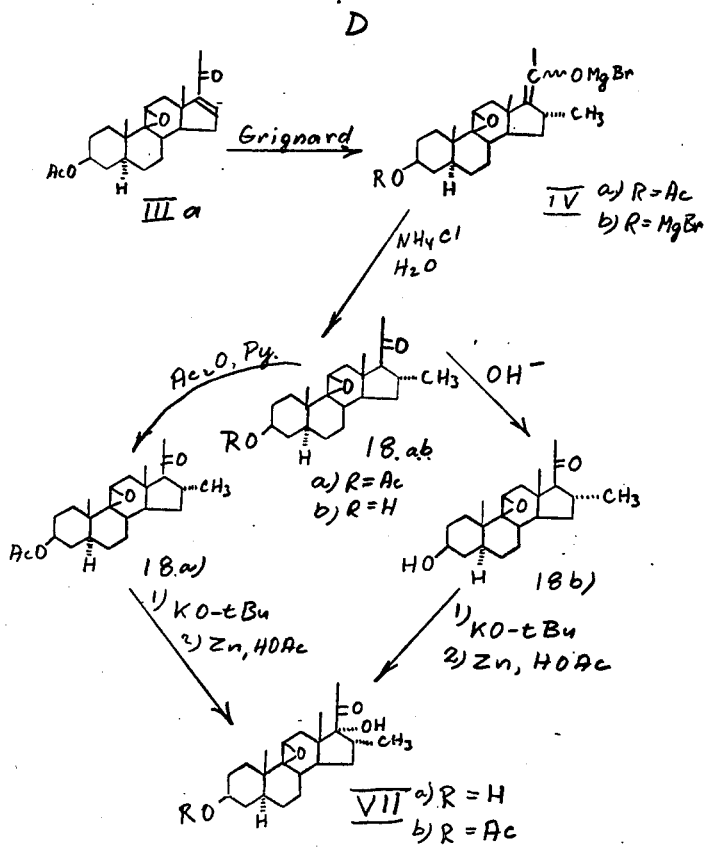

EXAMPLE 7:

To a solution of 30g of IIIa (3β-acetoxy-9β, 11β-epoxy-5αpregn-16-en-20-one, 0.08 Mole in 200ml dry tetrahydrofuran, which was being stirred under nitrogen at 0°–5°, was added a 30mg finely powdered cuprous chloride. Independently, a solution of 120ml methylmagnesium bromide 2N (0.24 Mole) is complexed by addition of 70mg finely powdered cuprous chloride under nitrogen during stirring in an ice water bath.

To the steroid solution was added slowly (cooling and stirring), the complexed methylmagnesium bromide solution, taking care that the temperature did not go above 5°. Under these conditions, the addition took 7 minutes and TLC check (See Example 6) indicated that the reaction was complete 5 minutes after completion of the addition. All the starting material had now been converted to IVa in solution. To this reaction mixture was added slowly 24ml acetyl chloride (0.32 Mole) which in 10 minutes formed the 20-enol acetate-3-acetate V (e.g.: 3β, 20ξ-diacetoxy-9β, 11β-epoxy-16α-methyl-5α-pregn-17(20) -ene). The clear solution was evaporated to dryness under reduced pressure, bath temperature 40°. To the residue was added a little each). The main extract was combined with the tailers and concentrated under reduced pressure in 40°C. water bath. Codistillation with water removed efficiently the last traces of chloroform. The residue was a yellowish semi-crystalline mass which TLC studies and I.R. spectrum showed to be the isomeric mixture of 3β, 20ξ-diacetoxy-9β, 11β-epoxy-16α-methyl-5α-pregn-17(20)ene. The isomers can be separated by fractional crystallization and by chromatography over silica gel columns. However, such separation is wasteful and unnecessary, as both isomers give the identical 17α-hydroxy-20-ketonic entity on being epoxidized by a peracid followed by alkaline hydrolysis.

EXAMPLE 8:

To the epimeric mixture V from Example 7 (which weighed 33g) was added 1l of chloroform and the solution was cooled to 0°–5° in an ice water bath. A separately prepared solution of 25ml 40% commercial peracetic acid with 1.25g of sodium acetate was added to the steroid solution and the resultant mixture left standing for two days in a deep freeze. The excess reagent was removed by washing with 1.5l of water. Additional washes with a solution of 5% ferrous sulfate in water, followed by 2N sodium carbonate solution, and finally by 1.5l of water gave a neutral extract free of acids, peracids and explosive organic peroxides. Chloroform was used for extraction of the remaining aqueous phases in all of the extractions described above. Evaporation of the chloroform extract to dryness under reduced pressure at a bath temperature of 40°, followed by codistillation with water, gave a semicrystalline residue of the isomeric mixture VI (3β-20ξ-diacetoxy9β,11β,17α,20-bisepoxy-16α-methyl-5α-pregnane). (The isomeric mixture can be separated but would not serve any purpose as both epimers on alkaline hydrolysis lead to the same 17α-hydroxy-20-ketone entity).

EXAMPLE 9:

Instead of using the epimeric mixture V from Example 7 which was obtained by evaporation of the chloroform extract, it was found that the extract after completion of the aqueous washings (1100ml) could be epoxidized directly with commercial peracetic acid exactly as described in Example 8 above. The same amount (32g) of VI was obtained and TLC and infrared spectra indicated the identical composition.

EXAMPLE 10:

Instead of using, for the epoxidation, the chloroform extract obtained after the aqueous washings as described in Example 9, it was found that the residue after distilling off the tetrahydrofuran/benzene solvent and codistillation with chloroform could be used for the epoxidation, after being made up to 1l volume with chloroform. However, as the anhydrous magnesium salts are present in the chloroform solution, the addition of the buffered peracetic acid should take place over a period of 1 hour of gradual addition while the flask is submerged in an ice water bath for cooling. Under those conditions, the 17(20) epoxidation progressed satisfactorily.

EXAMPLE 11:

The isomeric mixture VI (3β,20ξ-diacetoxy-9β,11β,17α(20)-bisepoxy-16α-methyl-5α-pregnane), 32g as obtained from Example 8 was dissolved in 300ml of methanol and 25g of anhydrous potassium carbonate added. This mixture was stirred under reflux, while a total of 170ml of water was dripped in during a period of 1 hour. After a total of about 2 hours of reflux, a precipitate started to appear. The reaction was maintained until TLC check showed that the less polar starting material had disappeared and also the medium polar intermediate mono acetates. After 3 hours of reflux, the reaction was complete and a thick slurry obtained. The crystals were harvested by filtration, washed with methanol/water (5:3), then with much water (to neutrality), collected and dried. This crude VIIA (3β,17α-dihydroxy-9β,11β-epoxy-16α-methyl-5α-pregnane-20-one) weighed 24g. This very insoluble compound exhibited a m.p. 255°–258°. Recrystallization from ethyl acetate using a Soxhlet gave the analytical sample m.p. 267°–269°, I.R. $\lambda_{max}$ at: 3420, 2920, 1700, 1450, 1350, 1100, 1060, 1038, cycm$^{-1}$ salient bands.

Anal: Calc.: $C_{22}H_{34}O_4$ (362.49): C, 72.89, H, 9.45
Found: C 72.51; H, 9.60

EXAMPLE 12:

To 10g of the product obtained from Example 11 which was VIIa (3β,17α-dihydroxy-9β,11β-epoxy-16α-methyl-5α-pregnan-20-one) were added 15ml of dry pyridine and 7.5ml of acetic anhydride, and the mixture was kept with magnetic stirrer at 100° for 2 hours. The reaction product was cooled to 50°, 2ml of water added and the stirring continued for another hour at 50°. Addition of 20ml of water, cooling, filtration of the crystals, washing on the filter with a little methanol and a large amount of water, collection and drying, gave 10.5g of VIIb (17α-hydroxy3β-acetoxy-9β,11β-epoxy-16α-methyl-5α-pregnan-20-one) which melted at: 164°–168°
One recrystallizationn from dichloromethane-methanol gave the analytical sample: m.p. 169°–171°, Salient bands in I.R.:

3500, 1722, 1700, 1450, 1358, 1240, 1025 cycm$^{-1}$

Anal: Calc.: $C_{24}H_{36}O_5$ (404.53): C, 71.25; H, 8.97
Found: C, 71.20; H, 9.07

EXAMPLE 13:

10g of VIIa was reacted exactly as described in Example 12, but instead of 7.5ml acetic anhydride 10ml of propionic anhydride was used. 17α-hydroxy-3β-propionoxy-9β,11β-epoxy-16α-methyl-5α-pregnan-20-one was isolated.

EXAMPLE 14:

To 80ml 2N (0.16 Mole) commercial methyl magnesium bromide in tetrahydrofuran was added, during agitation in an inert atmosphere of argon, 100mg finely powdered cuprous chloride, and the mixture was cooled to 5° over a 5 minute period. A solution of 26.5g of IIIb (3β-hydroxy-9β,11β-epoxy-5α-pregn-16-en-20-one, 0.08 Mole) in 180ml tetrahydrofuran was added as fast as possible, the addition rate governed by the temperature not being allowed to exceed 20°. The reaction was essentially complete 5 minutes after completion of the addition. There was obtained a solution of IVb, which is the 3.20-bis magnesium salt.

EXAMPLE 15:

To the solution from Example 14 containing 0.08 Mole of IVb was added slowly 24g heptanoyl chloride (0.16 Mole), which in 15-20 minutes formed the 20-enol enanthate-3β-enanthate. The clear solution was evaporated to dryness under reduced pressure, the residue taken up in chloroform and the inorganic salts washed out with ice and water. Repeated concentration to dryness gave a semi-crystalline (low melting) residue. This epimeric mixture analogous to V can be converted to the 17α-hydroxy-20-ketonic entity VIIa on being epoxidized by a peracid followed by alkaline hydrolysis as described in Examle 8.

EXAMPLE 16:

30g of IIIa was processed exactly as described in Example 7 but acetic anhydride was used instead of acetyl chloride for reaction with the enol magnesium salt. Essentially the same result obtained but the reaction was slow - about 2 hours to be complete.

EXAMPLE 17:

To 100ml dry ether was added 4g pure magnesium shavings, 15ml iodomethane and one crystal of elemental iodine. The mixture was refluxed until all mangesium had dissolved and 100ml of dry tetrahydrofurane was added over a period of 3-4. minutes. The methylmagnesium iodide started to crystallize liberating heat to the extent that most of the ether was lost through the reflux condenser. To the mixture was added a slurry of 1g powdered cuprous chloride in 100ml dry tetrahydrofurane, cooled to 5°, and a solution of IIIa (3β-acetoxy-9β,11β-epoxy-5α-pregn-16-en-20-one, 20g) in 200ml dry benzene was added within a period of 5 minutes taking care to avoid temperature increases above 20°. Thin layer of a sample quenched with saturated $NH_4Cl$ solution, showed no 1,2-attack at the 3-acetate function. The solution was essentially pure 20-enol-magnesium salt of the 3-acetate (IVa where Br is I). If quenched with saturated ammonium chloride solution as in Example 6, 18a is obtained directly without need to reacetylation.

EXAMPLE 18:

Potassium permanganate (1.64g) in aqueous acetone (48ml, 85 percent) was added during 1 hour to a stirred, ice-cooled solution of IIIa (3β-acetoxy-9β,11β-epoxy-5α-pregn-16-en-20-one, 4.2g) in a mixture of acetone (120ml) and glacial acetic acid (0.82ml). After treatment with zinc (3.2g), the solution was decanted from inorganic salts and zinc and concentrated under reduced pressure to a small volume. The product was extracted exhaustively with dichloromethane after the addition of water. The dichloromethane extracts were combined, washed with water, aqueous sodium bicarbonate and water, then dried over sodium sulfate. The dried dichloromethane solution was treated with "Darco" charcoal and evaporated to dryness under reduced pressure. The residue crystallized from methanol gave 2.7g of VIIIa (16α,17α-dihydroxy-3β-acetoxy-9β,11β-epoxy-5α-pregnan-20-one).

EXAMPLE 19:

The compound VIIb (13β-acetoxy-17α-hydroxy-9β,11β-epoxy-16α-methyl-5α-pregnan-20-one), 1 g is dissolved in 15 ml dichloromethane and cooled to 10°C. and the solution is saturated with HBr gas. The temperature is brought to 22° and a solution of 1.05 Mole ratio bromine dissolved in about ten times its volume of dichloromethane is added. By gently heating to about 24°, the bromination starts very fast, unmistakenly as indicated by violent liberation of HBr gas, and discharge of the bromine color. The HBr formed, as well as the HBr added initially, is removed by distillation in vacuo to half of the volume. The 21-position is now brominated and the 9β,11β-epoxide is now opened up to the corresponding bromohydrin (11.) (11β-OH, 9α Br. opening: trans, diaxial). The 3β-acetoxyfunction is methanolyzed off in the following manner: To the reaction mixture is added an equal volume of methanol (anhydrous, 100 percent) and HCl gas is bubbled in during cooling in such a manner that the resultant mixture is saturated with HCl at 28°. The HCl current is turned off and the temperature maintained at this level for 25 minutes. The mixture is poured into a large volume of water and the layers separated. The dichloromethane layers are washed with water repeatedly and all the aqueous layers combined and filtered. The solids so isolated are added to the dichloromethane extract, with its equal volume of acetone and 2 g of potassium acetate (original input of VIIb is 1 g). This mixture is heated under stirring, distilling off the solvent mixture continuously. The volume is replenished at intervals with fresh acetone so as to completely displace the dichloro-methane present. When no more dichloromethane separates in a sample of the distillate, the mixture is refluxed for another 8 hours to complete the reaction.

The reaction product 3β,17α-dihydroxy-21-acetoxy-9β,11β-epoxy-16α-methyl-5α-pregnan-20-one (1.) was obtained in a crystalline form by slow addition of water during stirring. It is directly useable for the subsequent step. Melting point recrystallized form ethyl acetate: 193°–195°.

EXAMPLE 20:

The oxidation of the 3α-hydroxyl group of compound 1. described in Example 19 with chromic trioxide to give the corresponding 3,20-diketone is carried out by dissolving 1 g of the 3-hydroxyl substance in 30 ml of acetone and maintaining a temperature of 15°–20° during slow addition of 1 ml of Jones' solution (26.72g chromium trioxide dissolved in 23ml concentrated sulfuric acid diluted with water to a total volume of 100ml). Addition of 25 ml of water caused a crystalline precipitate of 2. (17α-hydroxy-21-acetoxy-9β,11β-epoxy-16α-methyl-5α-pregnane-3,20-dione), which melted at about 200°–204°.

EXAMPLE 21:

The product 2. of example 20 was collected and dried and 1 g was suspended in 10 g of acetic acid and to it was added 5 g of 30 percent HBr in acetic acid. The temperature was adjusted to 18°–20°C. and 2.1 mole ratios of bromine dissolved in 5 ml of acetic acid was added slowly over a one-half hour period, the temperature being permitted to go to 24°C. During a period of standing which followed, the progress of the reaction could be followed by the disappearance of the bromine color. The mixture was kept for one-half hour after discharge of the color. By this time, the microcrystalline tribromide was obtained by pouring the entire reaction mixture into a large volume of water and ice. This material was collected by filtration, wshed with water to neutrality, dried in a vacuum stove at bath temperature 25°. One part of the tribromide was suspended in 15 parts of dimethyl formamide and heated slowly under stirring to a final temperature of 120°. Cooling and cautious water addition produced a crystalline precipitate starting when the temperature was about 45° and 5 ml of water had been added. After cooling in the deep freeze, the crystals were filtered, washed with water and dried. Recrystallization from ethyl acetate gave the purified sample identified as 17-α-hydroxy-21-acetoxy-9β,11β-epoxy-16α-methyl-pregna-1,4-diene-3,20-dione (3.) by m.p. determination in admixture with an authentic specimen and by comparison of the infrared and ultraviolet spectra.

EXAMPLE 22:

To a solution of 0.5gm of 17α-hydroxy-21-acetoxy-9β,11β-epoxy-16β-methylpregna-1,4-diene-3,20-dione (3.) prepared as in Example 21, in 25 ml of alcohol-free chloroform containing 10ml of tetrahydrofuran was added a stream of hydrogen fluoride gas until saturated, the temperature of the solution being kept at −25° for four hours. After concentration to a residue, the product was crystallized from acetone-hexane to give dexamethasone-21-acetate (4.a).

EXAMPLE 23:

A sample of VIIa from Example 11., 3β,17α-dihydroxy9β,11β-epoxy-16α-methyl-5α-pregnan-20-one, was oxidized at the 3-position with chromium trioxide as described in Example 20 to give 17α-hydroxy-9β,11β-epoxy-16α-methyl-5α-pregnane-3,20-dione (6.).

EXAMPLE 24:

The product of Example 23 (6.) was treated with hydrogen fluoride as described in Example 22 to give 11β,17α-dihydroxy-9α-fluoro-16α-methyl-5α-pregnan-3,20-dione (7.).

EXAMPLE 25:

The product of Example 24 (7.) was converted to dexamethasone acetate by (1) bromination and acetolysis as described in Example 19 producing compound 8, and (2) dehydrohalogenation with dimethylformamide as described in Example 21.

EXAMPLE 26:

The product of Example 23 (6.) was brominated as described in Example 19 with hydrobromic acid and then bromine to give 11β,17α-dihydroxy-2,4,9α,21-tetrabromo-16α-methyl-5α-pregnane-3,20-dione (9.).

EXAMPLE 27:

The product of Example 26 (9.) was subjected to acetolysis as described in Example 19, plus 9,11-epoxide ring closure with potassium acetate to give 10. (17α-hydroxy-21-acetoxy-9β,11β-epoxy-2,4-dibromo-16α-methyl-5α-pregnane-3,20-dione).

EXAMPLE 28:

The product of Example 27 (10.) was dehydrohalogenated as described in Example 21 with dimethylformamide to give 3. (17α-hydroxy-21-acetoxy-9β,11β-epoxy-16α-methyl-pregna-1,4-diene-3,20-dione).

EXAMPLE 29:

To a suspension of 10G VIIa (3β,17α-dihydroxy-9β,11α-epoxy-16α-methyl-5α-pregnan-20-one) in 110 ml acetic acid is added slowly 21 ml 32 percent HBr in acetic acid. The temperature is maintained at 18°. Immediately after completion of the addition which took 5 minutes, there was added a solution of 4.9 g bromine in 70 ml dichloromethane and the temperature was adjusted to 24°. The reactions were complete after about 10 minutes of response at 24°, and the clear solution was poured into a 2l separating funnel charged with 1.5l ice and water. The lower dichloromethane layer was separated, and the remaining aqueous layer re-extracted with two small tailers of dichloromethane. The combined dichloromethane extract was charged into a flask with 20 g anhydrous potassium acetate and a 250 ml of acetone. The solvent mixture was distilled off during maintenance of good agitation. The solvent in the flask was replenished with acetone several times, and the distillation was continued until no more dichloromethane was present in a sample of the distillate. At this point, 2 g potassium carbonate (anhydrous) was added and the flask was connected in reflux position. The reaction volume was adjusted to 250 ml with acetone, and the mixture was refluxed overnight. The following morning, concentration to half volume was effected, prior to precipitating slowly into 1.25l ice and water. The solids were filtered, washed with water, collected and dried. 11.2 g of crude 1. was obtained (3β,17α-dihydroxy-21-acetoxy-9β,11β-epoxy-16α-methyl-5α-pregnan-20-one). Recrystallization from ethyl acetate gave the purified sample, m.p. 194°–195°, identical with the product of Example 19 on mix melting point and infrared comparison.

The conversion of Example 18, and of the following Examples 30–36 which are below, are illustrated by formula set E.

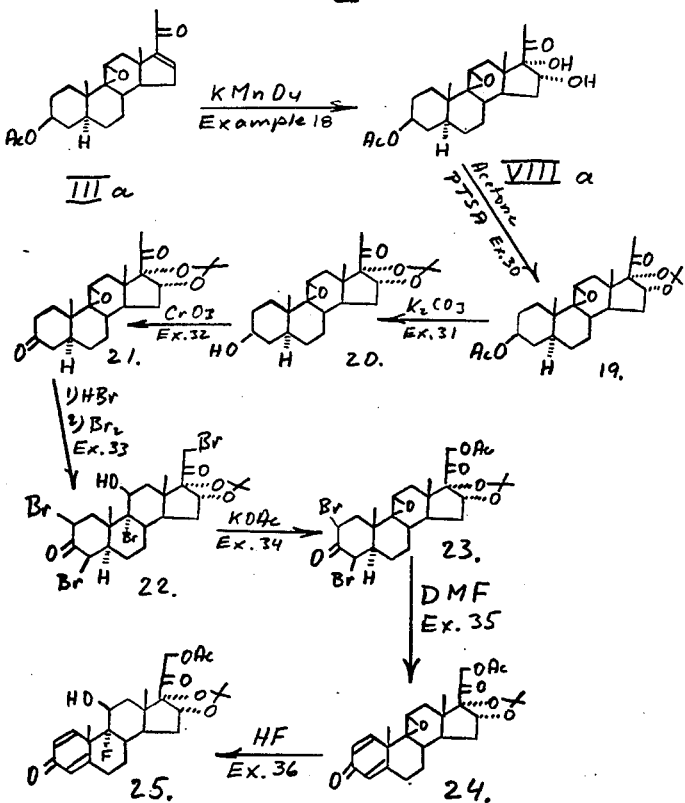

EXAMPLE 30:

The product of Example 18, compound VIIIa, 100mg, is suspended in 20ml of pure acetone, and 40mg of p-toluene-sulfonic acid in 10ml of acetone is added and the mixture stirred at room temperature for three hours. The solution is neutralized with dilute sodium bicarbonate and the acetone removed in vacuo. The suspension is filtered and washed and the acetonide is recrystallized from aqueous alcohol to give $16\alpha$-$17\alpha$-isopropylidene-$3\beta$-acetoxy-$9\beta,11\beta$-epoxy-$5\alpha$-pregnan-20-one (19.).

EXAMPLE 31:

The product of Example 30, compound 19, hydrolyzed with potassium carbonate in aqueous methanol to give $16\alpha$-,$17\alpha$-isopropylidene-$3\beta$-hydroxy-$9\beta,11\beta$-oxido-$5\alpha$-pregnan-20-one (20.).

EXAMPLE 32:

The product of Example 31, compound 20., is oxidized with chromium trioxide as described in Example 20 to give $16\alpha$ $17\alpha$-isopropylidene-$9\beta,11\beta$-oxido-$5\alpha$-pregnan-3,20-dione (21.).

EXAMPLE 33:

The product of Example 32, compound 21. was brominated as described in Example 19 with hydrobromic acid and bromine to give $16\alpha,17\alpha17\alpha$-isopropylidene-2,4,$9\alpha$,21-tetra-bromo-$11\beta$-hydroxy-$5\alpha$-pregnan-3,20-dione (22.).

EXAMPLE 34:

The product of Example 33, compound 22. was acetolyzed and dehydrohalogenated as described in Example 19 with potassium acetate to give a $16\alpha,17\alpha$-isopropylidene-2,4-dibromo-$9\beta,11\beta$-oxido-21-acetoxy-$5\alpha$-pregnan-3,20-dione (23.).

EXAMPLE 35:

The product of Example 34, compound 23. was dehydro-halogenated as described in Example 21 with dimethylformamide to give $16\alpha,17\alpha$-isopropylidene-$9\beta,11\beta$-epoxy-21-21-acetoxy-pregna-1,4-diene-3,20-dione (24.).

EXAMPLE 36:

The product of Example 35, compound 24. was treated with hydrogen fluoride to give the 21-acetate of triamcindone acetonide (25.) which could be hydrolyzed to triamcindone in the usual way c.f. (U.S. Pat. No. 3,126,175).

EXAMPLE 37:

The product of Example 1, compound IIIa, 1 g in 15 ml of aqueous methanol, is treated with 3 ml of 100 volume percent hydrogen peroxide and then 6 ml of 2N aqueous sodium hydroxide and the mixture stirred overnight at room temperature. The mixture was then poured into 20 ml water and extracted with dichloromethane.

The solvent was distilled off and the resulting 3-hydroxy steroid product reacetylated with acetic anhydride in an equal part of pyridine to give $3\beta$-acetoxy-$9\beta,11\beta$-$16\alpha,17\alpha$-bisepoxy-$5\alpha$-pregnan-20-one (12.).

EXAMPLE 38:

The product of Example 37, compound 12., was converted to its 20-ethylene ketal derivative with ethylene glycol in the usual way to give 13.

EXAMPLE 39:

The product of Example 38, compound 13., was reacted with methyl magnesium bromide, as described in Example 6, but omitting the cuprous chloride addition to give the 20,20-ethylene ketal of $3\beta,17\alpha$-dihydroxy-$9\beta,11\beta$-epoxy-$16\beta$-methyl-$5\alpha$-pregnan-20-one (14.). Some side reactions occurred at the $9\beta,11\beta$ oxide group.

EXAMPLE 40:

The product of Example 39, compound 14., was oxidized with chromium trioxide as described in Example 20, to give (15.), $17\alpha$-hydroxy-$9\beta,11\alpha$-epoxy-$16\beta$-methyl-$5\alpha$-pregnan-3,20-dione.

EXAMPLE 41:

The product of Example 40, compound 15, brominated with hydrobromic acid and bromine, reacted with potassium acetate and then dehydrogenated again by heating with dimethylformamide as described in Examples 19 and 21 to give $9\beta,11\beta$-oxido-$16\beta$-methyl-$17\alpha$-hydroxy-21-acetoxy-pregna-1,4-diene-3,20-one (16.).

EXAMPLE 42:

The product of Example 41, compound 16. was treated with hydrofluoric acid as described in Example 22 to give betamethasone acetate (17.).

EXAMPLE 43:

The 21-valerate may be prepared by either:
a. reaction of betamethasone acetate, prepared in the previous example with one equivalent of ammonia in ethanolic ethylene glycol or the use of methanolic HCl produces betamethasone, which can be reacted with valenoyl valeroyl chloride in dry pyridine to give betamethasone valerate.
b. reaction of compound 15, (From Example 40,), with HBr and $Br_2$, and then with potassium valerate in acetone gives the 21-valerate of $3\beta$, $17\alpha$, 21-trihydroxy-$9\beta$, $11\beta$-epoxy-$16\beta$-methyl-$5\alpha$-pregnan-20-one, which may be converted to betamethasone valerate by dehydrohalogenation with dimethyl formamide and addition of HF as described in Examples 41 and 42.

EXAMPLE 44:

The 21-disodium phosphate of betamethasone may be prepared by reacting betamethasone, prepared in Example 43, with one more of dimorpholido phosphoric acid chloride in dry absolute pyridine and kept at room temperature for five days. The mixture was then poured into water and extracted with chlorofrom to give betamethasone-21-dimorpholido phosphate. Passing an ethanol-water solution of the dimorpholido phosphate through a sulfonic acid ion exchange column heated to 60° gave, after washing the aqueous phase with ethylacetate, evaporating the aqueous phase, dissolving the residue in methanol and adding ether, a precipitate of the sodium salt of betamethasone-21-phosphate. Adjusting a solution of this compound to pH 8 gave the disodium salt.

EXAMPLE 45:

Betamethasone-17,21-diproprionate was prepared from betamethasone (From Example 43) by the reaction of two moles of propionic anhydride at room temperature with p-toluene sulfonic acid as a catalyst, followed by standing overnight at room temperature. Addition of hexane precipitated the dipropionate.

EXAMPLE 46

Betamethasone 21-benzoate is prepared from betamethasone (from Example 43) by reaction with one mole of benzoyl chloride in dry pyridine.

EXAMPLE 47:

Dexamethasone 6-butylacetate is prepared from dexamethasone and t-butylacetylchloride in dry pyridine as described in Example 43.

EXAMPLE 48:

Dexamethasone 21-phosphate disodium salt is prepared from dexamethasone (Example 22) as described in Example 44 for the betamethasone-21-phosphate disodium salt.

EXAMPLE 49:

Dexamethasone 21-phosphate is prepared from the monosodium salt, prepared as in Example 44, by the addition of one equivalent of sulfuric acid.

Alternatively, the phosphates of dexamethasone and betamethasone may be prepared by reaction of the 21-iodo compound (prepared from the 21-hydroxy by protecting the 3-keto group as an ethylene ketal, converting the 21-hydroxy group to a methylsulfonate and then reacting with NaI) silver dibenzyl phosphate, followed by catalytic debenzylation to the phosphate.

EXAMPLE 50:

Triamcinolone acetonide-21-phosphate is prepared from triamcinolone acetonide (Example 36) as described in Example 44.

EXAMPLE 51:

Triamcinolone acetonide-21-hemisuccinate is prepared from triamcinolone acetonide (Example 36), by treating a solution of 50 g of succinic anhydride in 500 ml of dry pyridine with 50 gm of triamcinolone acetonide during three minutes. The solution was allowed to stand for 20 hours and then poured into 2500 gm of ice containing 60 ml conc. HCl in 2000 ml water, stirring for 30 minutes and then filtering off the triamcinolone acetonide-21-hemisuccinate, which could be converted to the sodium salt by treatment in acetone with 0.5 N NaOH.

EXAMPLE 52

Dexamethasone-21-(3,6,9-trioxoundecanoate) is prepared from dexamethasone by reaction with 3,6,9-trioxodecanoyl chloride in dry pyridine, as described in Example 43.

What is claimed is:

1. A process for producing dexamethasone or -lower 21 esters from $3\beta$-lowr acyloxy-$5\alpha$-pregna-9,16 diene-20-one which comprises:
   a. reacting the 9 (11) double bond in the starting material molecule with hypobromous acid in aqueous acetone or butanone at temperature below about 15°C. to form selectively thereby a $9\alpha$ bromo $11\beta$ hydroxy steroid;
   b. effecting alkaline conditions dehydrohalogenation of the $9\alpha$ bromo-$11\beta$ hydroxy steroid to form a $9\beta,11\beta$-epoxy steroid;
   c. reacting the 20-keto,$\Delta16$ moiety of the $9\beta,11\beta$ oxido steroid with methyl magnesiom bromide or iodide to form thereby a $9\beta$, $16\beta$-epoxy, $16\alpha$ methyl steroid Grignard metal organic reaction product;
   d. reacting the Grignard metal organic reaction product with acetyl chloride, then oxidizing and alkaline hydrolysis to form thereby a $17\alpha$ hydroxy-$9\beta,11\beta$-epoxy-$16\alpha$ methyl steroid; and
   e. thereafter converting the $17\alpha$ hydroxy-$9\beta,11\beta$-epoxy-$16\alpha$ methyl steroid to dexamethasone or a 21-ester thereof.

2. A process for selectively coverting a $\Delta^{9,16}$-20-keto steroid compound to the corresponding $9\beta,11\beta$ epoxy $\Delta^{16}$ steroid which comprises;
   a. hydrobrominating the $\Delta^{9,16}$ steroid compound in aqueous acetone or butanone at temperatures below about 15°C. whereby is formed selectively the $9\alpha$ bromo-$11\beta$ hydroxy-$\Delta^{16}$ steroid;
   b. effecting alkaline conditions dehydrohalogenation of the $9\alpha$ bromo, $11\beta$ hydroxy moiety to form a $9\beta,11\beta$ epoxy $\Delta^{16}$-20-keto steroid product; and
   c. separating out such product from the alkaline condition reaction medium.

3. The process of claim 2 wherein the hypobromination and the alkaline conditions dehydrohalogenation are conducted in the same aqueous acetone or butanone reaction medium without separation out therefrom of the $9\beta$bromo-$11\beta$hydroxide intermediate.

4. The process for preparing an intermediate adapted for conversion into dexamethasone, the 21 tertiary butyl acetate thereof, the 21-(3,6,9-trioxoundecanoate) thereof, the 21-phosphate thereof or the like which comprises:
   a. reacting $3\beta$ lower acyloxy-$5\alpha$ pregna-9,16 diene-20-one with hypobromous acid in aqueous acetone or butanone at temperatures below about 15°C., forming thereby the $9\alpha$ bromo $11\beta$ hydroxy steroid;
   b. effecting alkaline conditions dehydrohalogenation of the $9\alpha$ bromo $11\beta$ hydroxy steroid, forming thereby a steroid selected from the group consisting of $3\beta$-lower acyloxy-$9\beta,11\beta$-epoxy-$5\alpha$ pregna-16-ene-20-one and $3\beta$ hydroxy-$9\beta,11\beta$-epoxy-$5\alpha$ pregna-16-ene-20-one;
   c. reacting said $9\beta,11\beta$ epoxy steroid with copper complexed methylmagnesium bromide in tetrahydrofuran solution to form thereby a $9\beta,11\beta$ epoxy $16\alpha$ methyl steroid Grignard metal organic reaction product; and
   d. thereafter converting said Grignard metal organic reaction product to a compound selected from the group consisting of $3\beta,17\alpha$ dihydroxy, $9\beta,11\beta$-epoxy-$16\alpha$ methyl-$5\alpha$ pregnan-20-one,$3\beta$-lower acetoxy-$17\alpha$ hydroxy, $9\beta,11\beta$-epoxy-$16\alpha$-methyl-$5\alpha$ pregnan-20-one by reaction with acetyl chloride followed by oxidation and alkaline hydrolysis.

5. The process for preparing an intermediate adapted for conversion into betamethasone, its 17,21 dipropionate, its 21-valerate, its 21-benzoate, its 21-phosphate and the like which comprises:
   a. reacting $3\beta$-lower acyloxy-$5\alpha$ pregnan-9,16-diene-20-one with hypobromous acid in aqueous acetone at temperatures below about 15°C., forming thereby the $9\alpha$-bromo-$11\beta$ hydroxy steroid;
   b. effecting alkaline conditions dehydrohalogenation of the $9\alpha$-bromo-$11\beta$-hydroxy steroid, forming thereby a $9\beta,11\beta$-epoxy steroid;
   c. peroxide treating the $9\beta,11\beta$epoxy steroid in alkaline medium, forming thereby a $9\beta,11\beta,16\alpha,17\alpha$-bis-epoxy steroid; then
   d. blocking the 20-one of the bis-oxido steroid by reaction with ethylene glycol, then reacting the bisepoxy steroid with methyl magnesium bromide in tetrahydrofuran solution to form thereby a $9\beta,11\beta$-epoxy-$16\beta$-methyl Grignard metal organic reaction product; and
   e. hydrolyzing the Grignard metal organic reaction product to $3\beta,17\alpha$-dihydroxy-$9\beta,11\beta$-epoxy-$16\beta$ methyl-pregnan-20-one.

6. A steroid according to the following formula:

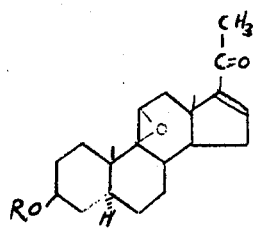

wherein R is hydrogen or lower acyl.

7. A steroid according to the following formula:

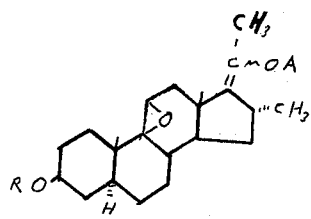

wherein A may be acetyl, MgBr or MgI
R may be hydrogen or lower acyl or MgBr when A is MgBr.

8. A steroid according to the following formula:

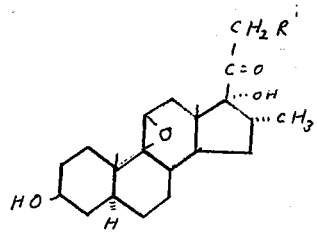

where R' may be hydrogen, hydroxyl or acetoxy.

9. A steroid according to the following formula:

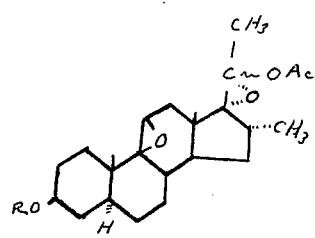

where R may be hydrogen or lower acyl.

10. A steroid according to the following formula:

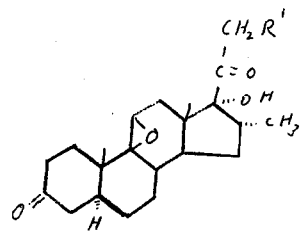

wherein R' may be hydrogen or acetoxy.

11. A steroid according to the following formula:

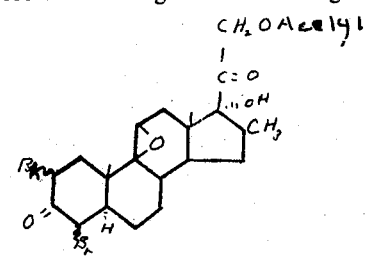

wherein the 16 methyl may be α methyl or β methyl.

12. A compound according to the following formula:

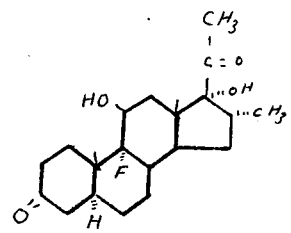

13. A steroid according to the following formula:

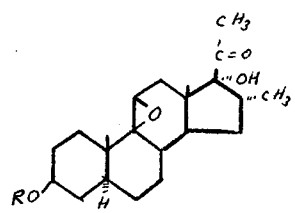

where R may be hydrogen or lower acyl.

14. The steroid of claim 13 wherein R is hydrogen.

15. The steroid of claim 13 wherein R is acetyl.

16. A steroid according to the following formula:

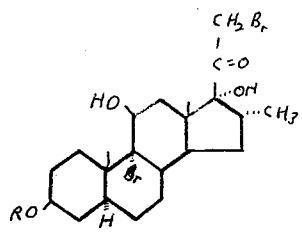

where R may be hydrogen or lower acyl.

17. A steroid according to the following formula:

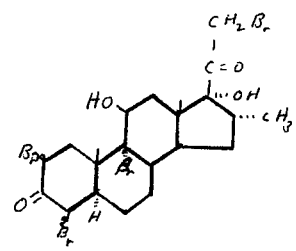

18. A steroid according to the following formula:

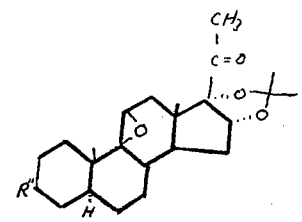

wherein R'' may be =O, —OH, or —O-lower acyl.

19. A steroid according to the following formula:

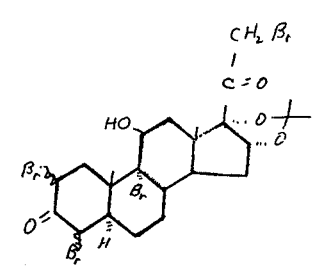

20. A steroid according to the following formula:

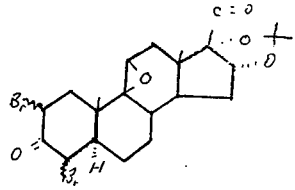
21. A steroid according to the following formula:
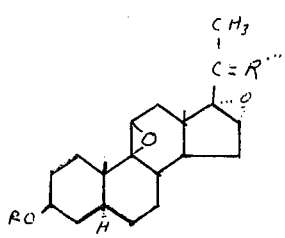
where R may be hydrogen or acetyl
R''' may be O or
22. A steroid according to the following formula:
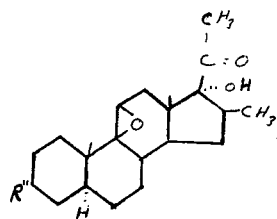
where R'' may be -OH or =O.
23. A steroid according to the following formula:
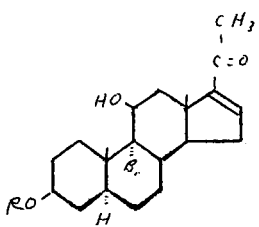
where R may be Hydrogen or lower acyl.
24. A steroid according to the following formula:
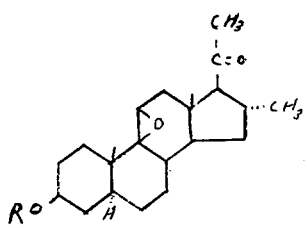
where R may be hydrogen or acetyl.
* * * * *